INVENTOR
Sol B Wiczer

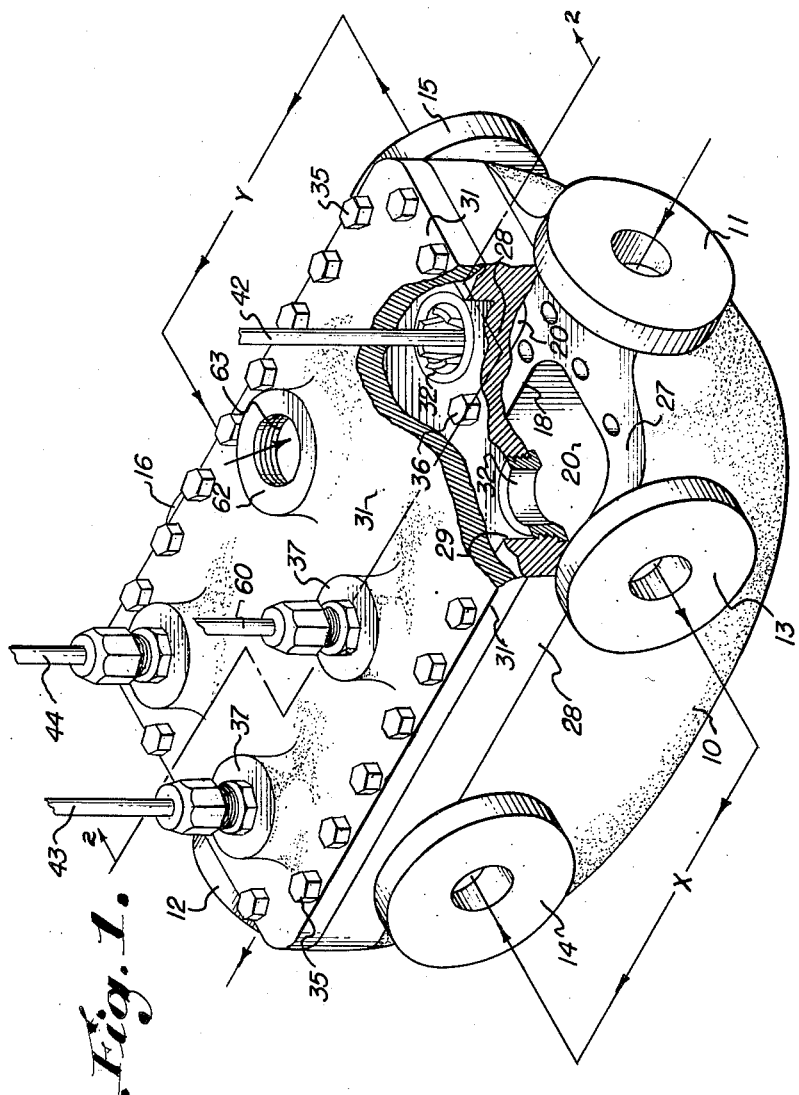

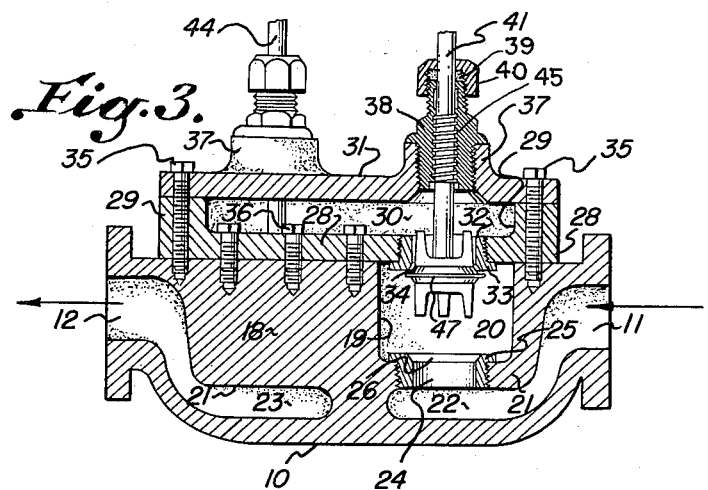
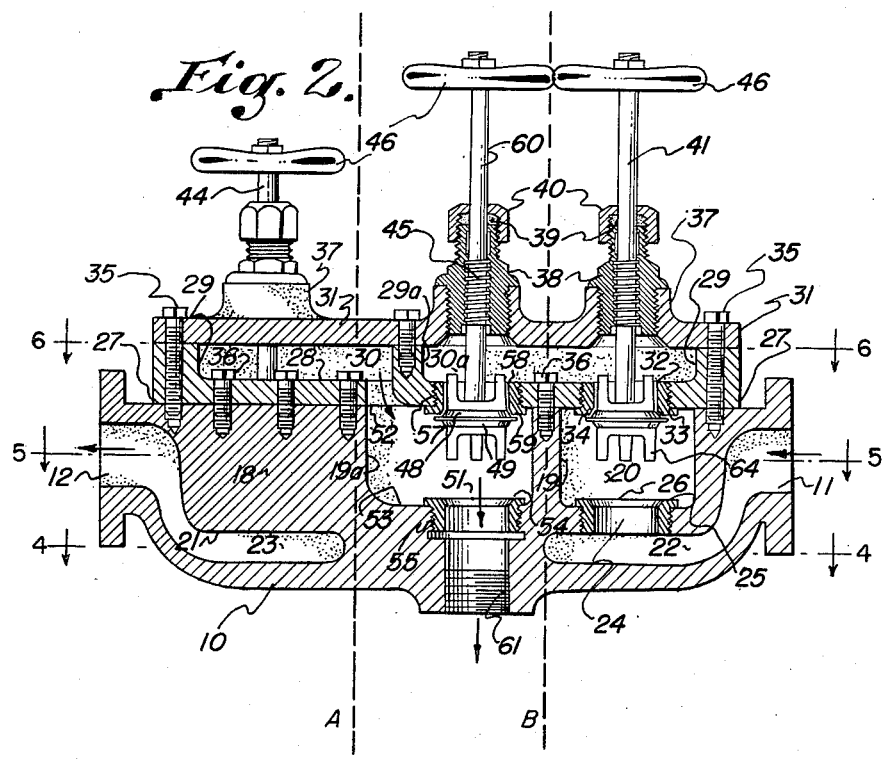

May 14, 1957 S. B. WICZER 2,792,017
MULTIWAY VALVE
Filed Oct. 30, 1951 5 Sheets-Sheet 4

INVENTOR

Sal B Wiczer

May 14, 1957    S. B. WICZER    2,792,017
MULTIWAY VALVE
Filed Oct. 30, 1951    5 Sheets-Sheet 5
Position A.    No flow.
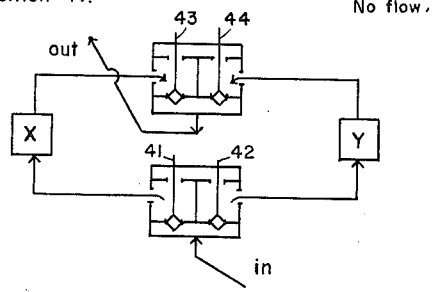
Position B.    No flow.
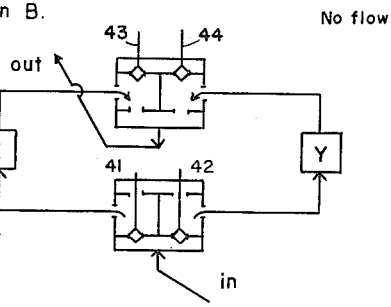
Position C.    No flow.
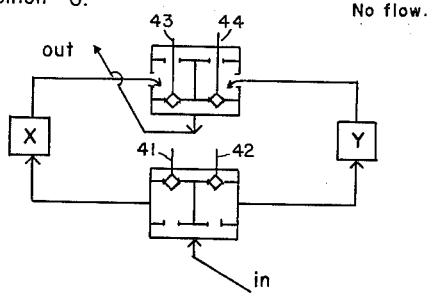
Position D.    Flow in parallel through both X and Y.
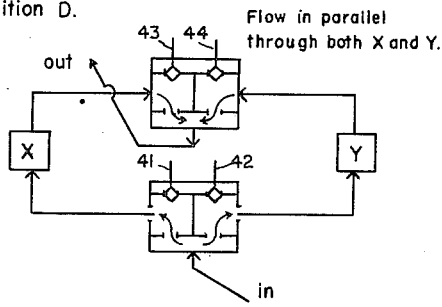
Position E.    Flow in series first through X and then through Y.
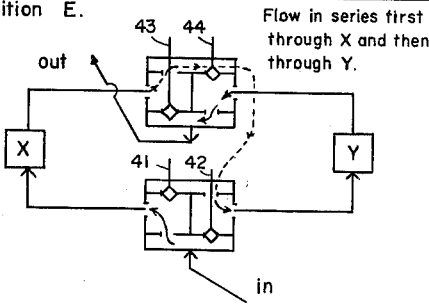
Position F.    Flow in series first through Y and then through X.
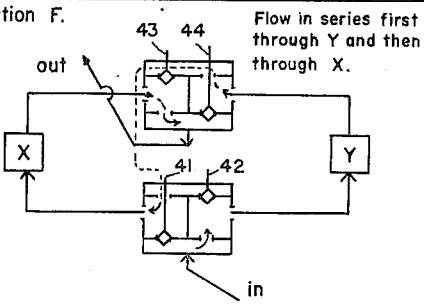
Position G.    Flow through X unit only.
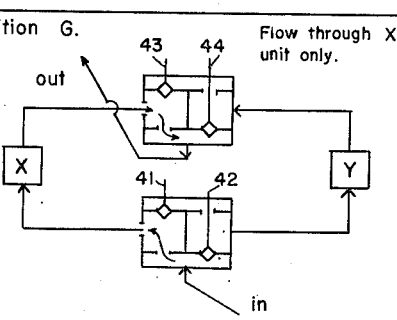
Position H.    Flow through Y unit only.
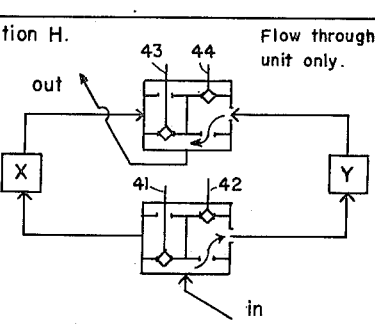
FIG. 9.
INVENTOR
Sol B Wiczer › # United States Patent Office 2,792,017
Patented May 14, 1957

2,792,017
MULTIWAY VALVE

Sol B. Wiczer, Washington, D. C.

Application October 30, 1951, Serial No. 253,839

9 Claims. (Cl. 137—599.1)

The present invention relates to a multiway valve of high versatility of flow control and is of particular utility for flow control of fluids between two operating units such as between a pair of pumps, tanks or filters etc., which normally require 4 to 8 way controls.

It is a primary object of the present valve construction to control the flow thru a pair of operating units either in parallel thru both units or in series so that fluid may pass reversibly first thru one unit and then thru the other in any desired sequence.

It is a further object to control the flow thru two operating units in such manner that the flow thru either or both units may be stopped.

It is a further object to control the flow in this manner by use of poppet type valve closures enabling firm seatings without scoring.

It is a further object to construct the valve in such manner that all or any portion of the fluid may be by-passed out of the system and returned as desired.

In the drawings Fig. 1 shows a perspective view of the most specific form of the valve and by-pass having some of the upper plate, and part of the stems, seats and bonnets broken away to show internal construction.

Fig. 2 is a sectional elevation of this valve taken on the line 2—2 of Fig. 1.

Fig. 3 is a simplified modification of the valve without the by-pass and is otherwise the same as Fig. 2; that portion of Fig. 2 between the dotted lines A and B being omitted.

Fig. 9 is a series of diagrammatical illustrations of various valve positions for flow control for either or both of a pair of units serviced by this valve in parallel or series or to stop flow.

Figure 4:
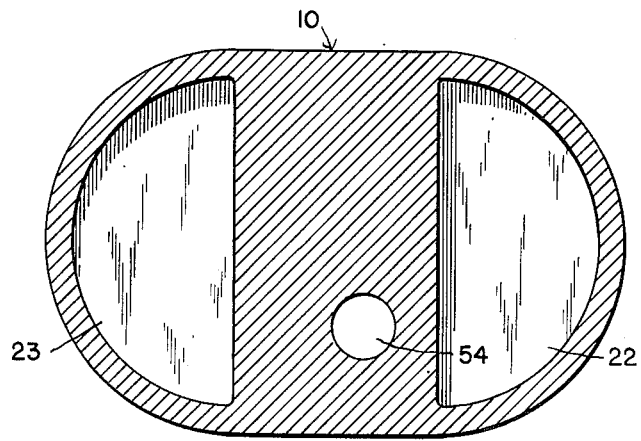
Fig. 4 is a plan section taken on the line 4—4 of Fig. 2.
Figure 5:
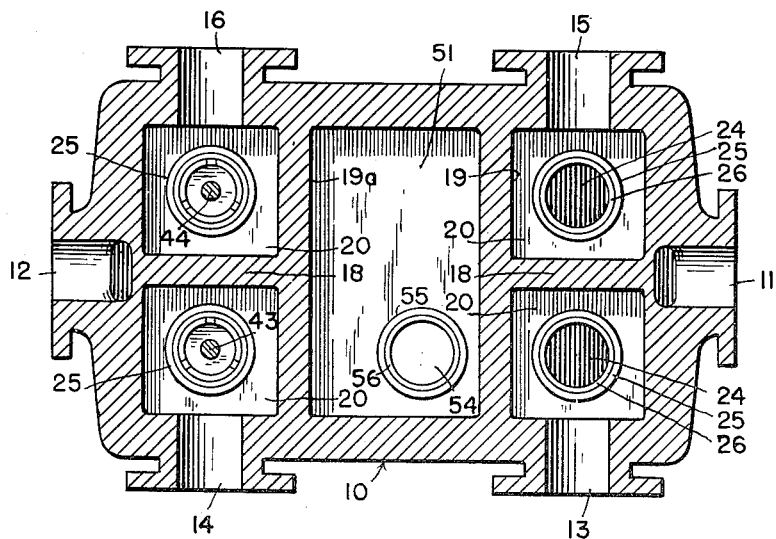
Fig. 5 is a plan section taken through the center of the valve on the line 5—5 of Fig. 2.

As shown, a valve body 10 has respective inlet and outlet openings 11 and 12 in opposite longitudinal ends. On each side of the valve are similar pairs of flow openings 13 and 14 leading and returning respectively to and from one operating unit X such as a pump, filter, chemical chamber, etc., and 15 and 16 (not fully shown in Fig. 1) on the opposite side of the valve, symmetrically therewith, leading and returning from the other operating unit Y.

The valve in the simplified form of Fig. 3 is internally partitioned into four chambers 20, in which only one is shown in this Fig., by a vertical partition 18 which divides the valve longitudinally into separate longitudinal halves and partition 19 which is at right angles to partition 18 and divides the valve body 10 into a pair of forward valve chambers 20 and a pair of after valve chambers 20. Thus side flow openings 13, 14, 15 and 16 each communicate with one independent partitioned valve chamber 20. It will be understood that the valve of Fig. 3 is perfectly symmetrical and either end may be inlet or outlet. The designation as forward and after chambers is only for clarification of the description of operation and for description applicable to the unsymmetrical modification illustrated in Figs. 1, 2, 4, 5, 6 and 8.

In the lower part of the valve chambers 20 at a level intermediate the valve body 10 is a horizontal partition 21 forming a bottom wall for each of the valve chambers 20 to separate them from ante chambers 22 and 23 located between the outer valve body 10 and the bottom partition 21, respectively at the forward or inlet part of the valve and the rear or outlet portion of the valve. Vertical longitudinal partition 18 terminates at the bottom intersection with the horizontal partition 21 and thus does not obstruct the ante chambers 22 and 23 which thus extend continuously from one side of the valve to the other. Vertical transverse partition 19, however, extends continuously to the bottom of the valve body 10 and thus divides the valve transversely in forward inlet and rear outlet halves which do not communicate at the bottom. Thus, by such partitioning, the valve body is divided into 4 chambers 20 having ante chambers 22 and 23 therebeneath with forward ante chamber 22 extending continuously beneath both forward chambers 20 and the after ante chamber 23 extending continuously beneath both after chambers 20. As shown, the inlet opening 11 communicates directly with ante chamber 22 and the outlet opening 12 communicates directly with the ante chamber 23.

Horizontal partition 21 is bored at the center of the bottom of each chamber 20 forming valve ports 24 so that both forward chambers 20 communicate with ante chamber 22 and thence with inlet 11 and both after chambers 20 communicate with ante chamber 23 and thence with outlet 12. The valve ports 24 are threaded to receive bushings 25 each having a beveled surface 26 forming a poppet type valve seat.

All of the outside walls of the valve body 10 and vertical partitions 18 and 19 terminate at the top in a common plane 27 on which is fitted a flat separator plate 28, having a peripheral flange 29 turned up to form an upper chamber 30 with a top cover plate 31.

Figure 6:
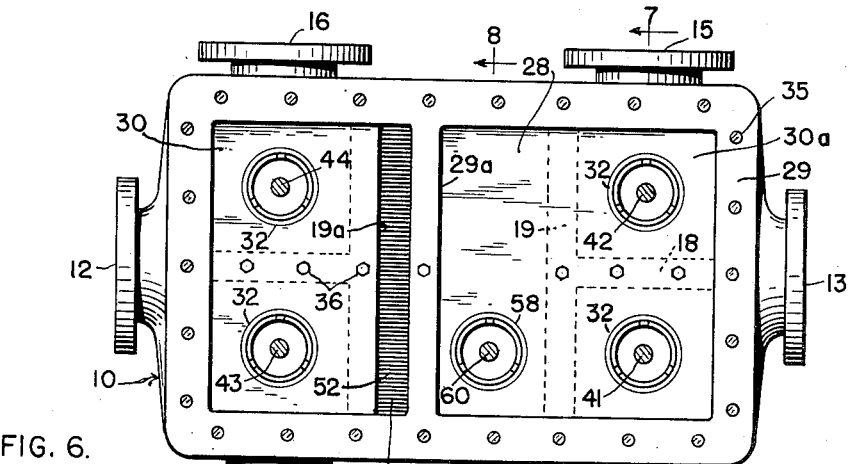
Fig. 6 is a plan of the top of the valve with the upper plate removed taken on the line 6—6 of Fig. 2.

As shown in Figs. 3 and 6 the separator plate 28 forms a top horizontal wall and closure for each of the four chambers 20 and has four upper ports 32 each bored in vertical alignment with one of the lower ports 24 in a corresponding chamber 20. Each of the upper ports 32 is threaded to receive a bushing 33 having a beveled edge 34 forming a poppet type valve seat in vertical alignment with the lower valve seat 26. Cover 31 is bolted fluid tight at the edges together with separator plate 28 thru the flanges 29 to the outer walls of the valve body 10 as shown at 35. The separator plate 28 is further bolted fluid tight to the vertical partitions 18 and 19 as shown at 36.

Cover plate 31 is provided with raised bosses 37 threaded to receive a valve bonnet comprising a conventional plug 38, packing 39 and cap 40 each supporting a valve stem of which numerals 41 and 42 are used respectively to designate the left and right forward valve stems and numerals 43 and 44 respectively designate the left and right after valve stems. Each valve stem is threaded at 45 for vertical reciprocation by rotation of a hand wheel 46 fitted on the outer end.

Each valve stem 41, 42, 43 and 44 is centrally mounted for vertical reciprocation between a lower 24 and upper 32 valve port in each chamber 20 and has horizontally mounted at the bottom of each stem a single closure disc 47 with upper 48 and lower 49 beveled edges which seat on the upper 34 and lower 26 beveled edges of the bushings 33 and 25 to alternately close either the upper or lower ports 32 and 24 as the stems are reciprocated by rotation of the hand wheels 46.

As shown in Fig. 3 upper chamber 30 extends over the top of the valve and all four chambers 20 communicate directly therewith and thus with each other except as the upper ports 32 may be closed by the closures 47 being set in the upper position.

Figure 7:
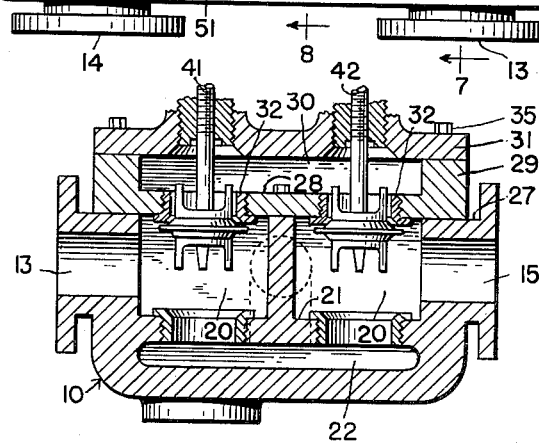
Fig. 7 is an end elevational section through the forward ports taken on the line 7—7 of Fig. 6.

Operation of the simplified valve shown in Fig. 3 is demonstrated for control of flow by diagrams of Fig. 9 between a pair of filters X, receiving fluid from the side port 13 and returning it after filtration to the side port 14 and Y, receiving fluid from side port 15 and returning it to side port 16. The diagrams of Fig. 9 illustrate the various valve positions for flow control. Each diagram illustrates a different possible combination of valve positions by setting forth in a lower rectangle, diagrammatically representing a forward section through the valve chamber like Fig. 7, the position of the forward valve closures 41 and 42 as closing either upper or lower forward ports and resulting flow therethrough, and in the upper rectangle, a similar diagrammatic section through the after valve chambers, the position of the after valve closures 43 and 44 with respect to their ports and resulting fluid flow therethrough. Where fluid passes from an after port through the chamber 30 to enter a forward port, this is illustrated diagrammatically by a dotted line to indicate that such flow takes place internally within the body of the valve via chamber 30.

As shown in position A of Fig. 9, with all four valve closures seated upon lower ports no fluid can enter the system nor leave it, hence this is a no-flow position.

In position B both of the after valve ports are in the upper position and they both forward remain seated on lower inlet ports, hence this too is a no-flow position since no fluid can enter the system.

In position C both of the forward ports are in the upper open inlet position with respect to fluid entering the system, but both after ports are closed in the lower after outlet position preventing fluid from leaving the system, hence since no fluid leaves, this again is a no-flow position, because with outlets closed no fluid can enter or leave the system.

Position D illustrates parallel flow Thus if it were desired to divide the flow of fluid entering inlet 11 so as to pass in parallel simultaneously thru both filters X and Y then each of the valve stems 41, 42, 43 and 44 would be reciprocated to close all the upper ports 32. The fluid would then enter at 11, pass into the ante chamber 22, divide and pass into both open lower forward ports 24 and pass into both forward left and right chambers 20 and then out of side ports 13 and 15 to both filters X and Y in parallel and return to after valve chambers 20 through respective side ports 14 and 16; passing out of after chambers 20 thru both open lower after ports 24; the parallel flows join in after ante chamber 23 and pass out of the valve through outlet 12.

Positions E and F illustrate series flow through filters X and Y using the simplified form of valve of Fig. 3. For position E it is assumed that the fluid is to pass in series first thru filter X and then is to be given a second filtration thru filter Y. In this type of filtration, valve stems 42 and 43 (right forward and left rear) are reciprocated to close lower ports 24 of their respective chambers 20 simultaneously opening their upper ports 32, while valve stems 41 and 44 are allowed to remain reciprocated to the upper position closing their upper ports 32 and opening their lower ports 24. It will be recognized in this position only the lower left forward and lower right rear chambers 20 communicate respectively with ante chambers 22 and 23 and thus with the valve inlet and outlet, while, left rear and right forward chambers 20 communicate through upper ports 32 with each other via upper chamber 30. Thus fluid entering at 11 passes only into the left forward chamber 20 from ante chamber 22 and its open lower port 24. The fluid thus passes out through side port 13, into filter X, and thence back through side port 14 into left rear chamber 20 and thence up into intermediate chamber 30 from which it passes into right forward chamber 20 and thence out right side port 15 and into filter Y. After the second filtration it returns to the valve through side port 16 into right rear chamber 20 and thence passes downward to ante chamber 23 and out of outlet 12.

Position F illustrates the direct opposite condition of series flow, first through the Y unit and then through the X unit. Obviously, the valve positions of position E are merely reversed. Thus forward-stem 41 (left) will close its lower port and 42 (right) will have its lower port open. After-stem 43 (left) will have its lower port open and after-stem 44 (right) will have its lower port closed. Fluid passes through open lower forward right to the Y unit returning to right after chamber 20. Both open upper ports of 44 and 41 communicate with each other, hence fluid flows into forward left chamber, thence out to the X unit, returning to left after chamber 20 and thence out through the ante chamber 23.

If, flowing thru series position F, the filter Y becomes contaminated and it is desired to stop the flow therethrough while continuing the flow through filter X, it is only necessary to reverse stems 41 and 42 so that 41 now opens lower left forward port 24 and closes left upper forward port 32 and stem 42 closes lower right forward port 24 and opens right upper port 32. Stems 43 and 44 remain as last described in position F with stem 43 opening lower port 24 and stem 44 still closing lower port 32. This is illustrated as valve position G. Thus both right hand lower ports 24 are closed and right hand upper ports are open but communicate only with each other through intermediate chamber 30 so that no fluid enters or leaves the right hand system to which filter Y communicates through side ports 15 and 16. As to filter X connected to the left hand system, fluid entering through 11 enters left hand lower ports 24, and out of left forward chamber 20 and side port 13 to filter system X, from which it returns to left rear chamber 20 through side port 14, leaving through bottom port 24, ante chamber 23 and outlet 12.

Obviously if it were desired to flow through the right hand unit Y only then both stems 42 and 44 (right hand) would be reciprocated to open the lower ports 24 closing upper ports 32 and 41 and 43 to open upper ports 32 and close lower ports 24. This is the valve position H.

The following table shows the stem positions for any kind of flow as illustrated in Fig. 9.

| Cycle | Valve Stem Position to Close Port | | | |
|---|---|---|---|---|
| | 41 | 42 | 43 | 44 |
| | Left Fwd. | Rt. Fwd. | Left After | Rt. After |
| No Flow | Lower[1] | Lower | Lower | Lower |
| No Flow | Lower | Lower | Upper[2] | Upper |
| No Flow | Upper | Upper | Lower | Lower |
| Flow in Parallel Thru X and Y | Upper | Upper | Upper | Upper |
| Flow in Series First Thru X then Thru Y | Upper | Lower | Lower | Upper |
| Flow in Series First Thru Y then Thru X | Lower | Upper | Upper | Lower |
| Flow Thru X only | Upper | Lower | Upper | Lower |
| Flow Thru Y only | Lower | Upper | Lower | Upper |

[1] Lower—Closes lower port 24 and opens upper port 32.
[2] Upper—Closes upper port 32 and opens lower port 24.

It will be understood that the operating units X and Y may be any type of units, mechanical, such as pumps, engines, presses, motors, as well as chemical. Obviously the units X and Y do not need to be the same, the valve merely serving to combine two units into cooperative relationship. Thus one unit may be a water softener, and the other a tank of revivifying chemical therefor.

A preferred use for this valve is as control valve between two chemical units such as between two filters, or chemical reaction or catalyst chambers.

For this purpose it is desirable to be able to by-pass part of the fluid for conditioning all or part thereof as by adding a supply of chemical thereto to be carried into the second unit in series, or to adjust the temperature etc. prior to passing into the second unit. Accordingly a by-pass is built into the valve to form the modified valve of Figs. 1, 2, 4, 5, 6, and 8.

The valve of Figs. 1 and 2 is similar to that of Fig. 3 except a transversely extending intermediate chamber 51 formed by separating forward and after chambers 20 with two generally parallel transverse partitions 19 and 19a longitudinally spaced to form between them the single chamber 51 extending athwart the middle of the valve between forward and after chambers 20.

The separator plate 28 of Fig. 2 has a middle flange 29a which extends transversely across the valve and is bolted to the top plate 31 so that the upper chamber 30 is divided into an after upper chamber 30 and forward upper chamber 30a. Separator plate 28 has a slot 52 in the surface adjacent the middle flange 29a on the side of the after chamber 30 so that after chamber 30 is in continuous communication thru slot 52 with the middle chamber 51. The floor 53 of the chamber 51 is solid and integral with the valve body 10 and is bored at 54 thru the body 10, threaded and fitted with a bushing 55 having a valve seat surface 56 beveled in the upper edge. Plate 28 is also bored at 57 in vertical alignment with the lower bore 54 and is similarly threaded and fitted with a bushing 58 having a lower surface beveled to form a valve seat 59. A valve stem 60 vertically aligned with both upper and lower bores 57 and 54 has fitted to the lower inner end a valve port closure disc 47 with upper and lower beveled edges 48 and 49 fitted to alternately close ports 57 and 54, the stem 60 being similarly mounted for reciprocation from a boss 37 in plate 31 having an opening vertically aligned with ports 57 and 54 in which is threaded a plug 38, packing 39 and cap 40, to support the stem 60 by similar threads 45 for reciprocation.

The lower bore 54 passes through the valve body and is further threaded at 61 to receive pipe fittings and conduct the flow out of the valve according to the by-pass requirements. The top cover plate 31 has another boss 62 suitably located to form a return port 63 and for the by-passed fluid into the forward upper chamber 30a, by boring and threading at 63 to receive pipe fittings. The return pipe fitting (not shown) will contain a conventional check valve directing the flow into chamber 30a and preventing any fluid from passing back out of the valve through port 63.

In operation of this valve of Figs. 1, 2, 4, 5, 6, and 8, if stem 60 is reciprocated to close the lower port 54 simultaneously opening upper port 57, thus closing the by-pass, so that the valve operates exactly like the simplified valve of Fig. 3 except that the fluid passes from after upper chamber 30 into and out of the intermediate chamber 51 entering either forward chamber 20 from forward upper chamber 30a.

Figure 8:
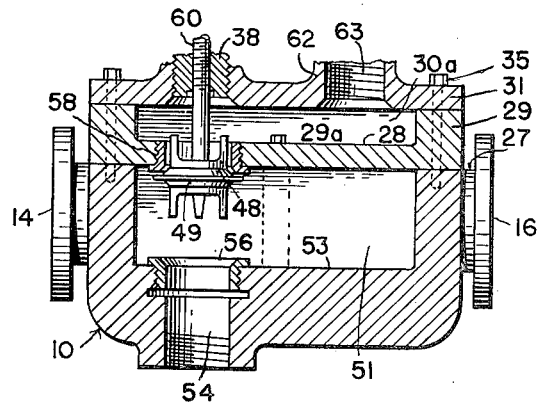
Fig. 8 is an elevational section through the recycling chamber taken on the line 8—8 of Fig. 6.

With the stem 60 reciprocated to close the upper port 57, the position as shown in Figs. 2 and 8, fluid entering chamber 51 via slot 52 in chamber 30 will pass out of the valve through open lower port 54, pick up chemical or be otherwise treated, and return through port 63 to chamber 30a, passing thence to one of the forward chambers 20 and then on to the second operating unit of the series.

In a typical use of the valve of Figs. 1, 2, 3, 4, 5, 6 and 8, it would be set up between two units such as filters X and Y as shown and the by-pass inlet and outlet would be connected to a chemical pot (not shown) containing a slurry of filter aid such as diatomaceous earth. The by-pass would first be closed and the fluid to be filtered would pass first to filter X and then to filter Y. After flow was established, the by-pass would be opened and chemical slurry picked up and deposited on filter Y.

The sequence of flow would then be changed to pass first thru charged filter Y and then thru filter X with the by-pass closed. The chemical pot would then be recharged, the by-pass reopened to pick up chemical and deposit it on filter X and the by-pass again closed. From this point with both filters charged the filter flow could be continued or changed to opposite sequence or flow may be passed in parallel thru both filters to obtain increased volume. Thus it is possible to continuously clean, charge, and operate a pair of units while filtering continuously.

The valve as shown is illustrative and not limiting. Various changes particularly the substitution of mechanical valve stem reciprocating mechanisms whereby one or more stems may be manipulated to upper and lower positions may be made. It may also be desired to operate two stems with a single mechanical movement as shown in my copending application Serial No. 579,378, filed February 23, 1945, now Patent 2,572,899 issued October 30, 1951.

I claim:

1. A multiway valve adapted to receive, control the flow of and pass fluid out of a system comprising at least two operating units, said valve having a main inlet chamber to receive fluid for distribution to at least two operating units of the system, a main outlet chamber to receive return flow from said operating units and pass the same out of the system, means in said valve for controlling flow of fluid between said operating units in any sequential series, and means for by-passing at least a portion of said fluid out of said series and back into the series intermediate the flow thru the series of operating units.

2. A multiway valve adapted to receive, control the flow of and pass fluid out of a system comprising at least two operating units, said valve having a main inlet chamber to receive fluid for distribution to at least two operating units of the system, a main outlet chamber to receive return flow from said operating units and pass the same out of the system, several internal partitioning elements dividing said valve body into a plurality of chambers intermediate said inlet and outlet chambers, valve ports in said partitioning elements having poppet type valve port closures mounted for reciprocating control of each valve port, and means for reciprocating said valve closures to control the fluid flow to any one or all of said operating units in any sequential series or in parallel.

3. A multiway valve comprising a valve body subdivided by partitions into several forward chambers and several after chambers, openings in said valve body for passing fluid out of each forward chamber to an operating unit and openings in said valve body for receiving return flow from an operating unit in each after chamber, two valve ports in each chamber, a main fluid inlet in said valve body communicating thru one of said valve ports with each of the forward chambers and a main fluid outlet communicating thru one of the valve ports with each of said after chambers, all of said chambers communicating with each other thru the other of said valve ports, and means for controlling the flow of fluid thru all of said valve ports.

4. A multiway valve comprising a valve body subdivided by partitions into several forward chambers and several after chambers, openings in said valve body for passing fluid out of each forward chamber to an operating unit and openings in said valve body for receiving return flow from an operating unit in each after chamber, two valve ports in each chamber, a main fluid inlet in said valve body communicating thru one of said valve ports with each of the forward chambers and a main fluid outlet communicating thru one of the valve ports with each of said after chambers, all of said chambers communicating with each other thru the other of said valve ports, and poppet type valve closures mounted for reciprocating control of flow thru each of said valve ports.

5. A multiway valve comprising a valve body subdivided by partitions into several forward chambers and several after chambers, openings in said valve body for passing fluid out of each forward chamber to an operating unit and openings in said valve body for receiving return flow from an operating unit in each after chamber, two aligned valve ports in each forward and after chamber, a single valve port closure mounted in each chamber for reciprocating movement to alternately close each of said valve ports, a main fluid inlet in said valve body communicating thru one valve port with each of said forward chambers, a main fluid outlet communicating thru one valve port with each of said after chambers, all of said chambers communicating with each other thru the other of said valve ports, and means for reciprocating each of said valve stems.

6. A multiway valve comprising a valve body subdivided internally by vertical and horizontal partitioning elements into chambers comprising four central chambers having a single forward inlet chamber underlying both forward central chambers, a single after outlet chamber underlying both after central chambers, and an upper chamber overlying all of the four central chambers, openings in said valve body for passing fluid out of each forward central chamber to an operating unit and openings in said valve body for receiving return flow from an operating unit in each after chamber, two vertically aligned valve ports in upper and lower partitioning elements of each of the four central chambers whereby the said forward inlet chamber communicates with each of the forward central chambers, the said after outlet chamber communicates with each of the central after chambers and the said upper chamber communicates with all four of the central chambers, a single valve port closure in each of the four central chambers mounted to alternately close each of the aligned valve ports, an opening in said valve body communicating with the lower forward inlet chamber, an opening in the valve body communicating with the lower forward outlet chamber and means for reciprocating each of the valve port closures to upper and lower valve port closure positions.

7. A multiway valve comprising a valve body subdivided by partitioning elements into several forward chambers, several after chambers and an intermediate by pass chamber, openings in said valve body for passing fluid out of each forward chamber to an operating unit, for receiving return flow from an operating unit in each after chamber, for by passing fluid out of the valve from the intermediate chamber and for receiving return flow of by passed fluid, two valve ports in each chamber, one of the valve ports of the intermediate chamber communicating with the by pass outlet in the valve body, a main fluid inlet opening in said valve body communicating thru one of said valve ports with each of the forward chambers, a main fluid outlet opening in said valve communicating thru one of the valve ports with each after chamber, each of the other valve ports in each after chamber communicating with the intermediate chamber, each of the other valve ports in each of the forward chambers communicating with the other valve port in the intermediate chamber and with the by pass return opening in the valve body, and means for controlling the flow of fluid thru all of said valve ports.

8. A multiway valve comprising a valve body subdivided internally by vertical and horizontal partitioning elements into an intermediate chamber, two central forward chambers and two central after chambers on both sides of said intermediate chamber, two valve ports and valve closure elements therefor in opposite upper and lower horizontal walls of each chamber, openings in said valve body for passing fluid out of each central forward chamber to an operating unit, for receiving return flow from an operating unit in each central after chamber, for by passing fluid out of the intermediate chamber and for receiving return by passed fluid, a main inlet chamber beneath the central forward chambers and communicating with each of them thru the lower valve ports therein and with a main inlet opening in the valve body, a main outlet chamber beneath the central after chambers communicating with each of them thru the lower valve ports in each and with a main outlet opening in the valve body, an upper after chamber above the after central chambers and a portion of the intermediate chamber and communicating thru the upper valve ports with each central after chamber, said upper after chamber being in continuous communication with the intermediate chamber, an upper forward chamber above the central forward chambers and part of the intermediate chamber, said upper forward chamber communicating with the central forward chambers thru the upper valve ports in each, with the intermediate chamber thru the upper valve port therein and with the by pass return opening in the valve body, and means effecting movement of the valve port closures to control the flow thru the valve ports.

9. A multiway valve comprising a lower cuplike body element having a vertical partition completely separating the valve body into two sections, lower horizontal partitions dividing said sections into upper and lower chambers in each section, upper vertical partitions angular to the first mentioned partition intercepting the same above the horizontal partitions dividing the upper chambers into four chambers separated by the horizontal partitions from the two lower chambers and by the vertical partitions from each other, valve ports in the horizontal partitions thru which each lower chamber communicates with two of the upper chambers, several openings in the valve body to which fluid conduits may be connected communicating with each chamber, an intermediate member horizontally mounted over the partitioned cuplike body forming a top closure for the four chambers and having four valve ports aligned with the lower valve ports in each chamber, a peripheral flange like spacing element and an upper plate mounted thereon, said intermediate member, said spacing element and upper plate defining an upper chamber communicating with the four chambers in the valve body thru the upper valve ports in the intermediate member, valve closure operating stems mounted for reciprocation on said upper plate member, valve port closure elements on the inner end of each valve stem fitted for alternate closure of the upper and lower valve port in each chamber, and means for reciprocating each valve stem.

References Cited in the file of this patent

UNITED STATES PATENTS

| | | |
|---|---|---|
| 158,305 | Picq | Dec. 29, 1874 |
| 502,583 | Rankine | Aug. 1, 1893 |
| 2,060,220 | Kennedy | Nov. 10, 1936 |
| 2,068,814 | Mousley | Jan. 26, 1937 |
| 2,165,096 | Frechette | July 4, 1939 |
| 2,226,192 | Barrett | Dec. 24, 1940 |
| 2,240,163 | Pick | Apr. 29, 1941 |
| 2,387,007 | Buchanan | Oct. 16, 1945 |
| 2,443,679 | Glantzer | June 22, 1948 |
| 2,586,932 | Gardiner | Feb. 26, 1952 |

FOREIGN PATENTS

| | | |
|---|---|---|
| 519,086 | Great Britain | of 1940 |